United States Patent
Wu et al.

(10) Patent No.: US 6,460,809 B1
(45) Date of Patent: Oct. 8, 2002

(54) SPACECRAFT METHODS AND SYSTEMS FOR AUTONOMOUS CORRECTION OF STAR TRACKER CHARGE-TRANSFER-EFFICIENCY ERRORS

(75) Inventors: Yeong-Wei Wu, Rancho Palos Verdes; Rongsheng Li, Hacienda Heights; James H. Green, Rancho Palos Verdes, all of CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/769,637

(22) Filed: Jan. 25, 2001

(51) Int. Cl.$^7$ .................................................. B64G 1/36
(52) U.S. Cl. ..................................... 244/171; 250/203.1
(58) Field of Search ............................ 244/171, 158 R; 50/203.1, 203.6; 356/141.5; 382/103

(56) References Cited

U.S. PATENT DOCUMENTS

| | | | |
|---|---|---|---|
| 4,351,004 A | * | 9/1982 | Choate et al. |
| 4,658,431 A | * | 4/1987 | Yokota |
| 4,672,220 A | * | 6/1987 | Haberl |
| 4,740,681 A | * | 4/1988 | Tsuno |
| 5,223,702 A | * | 6/1993 | Conley |
| 5,500,521 A | * | 3/1996 | Suzuki |
| 5,973,310 A | * | 10/1999 | Lunscher |

OTHER PUBLICATIONS

Holst, Gerald C., CCD Arrays, Cameras and Displays, JCD Publishing, Winter Trail, Florida, 1998, pp. 58–61 and 74–79.
CT–600 star tracker data sheet, Ball Aerospace & Technologies Corp. 1600 Commerce Street, Boulder, Colorado.
600 series star tracker data sheet, Spectral Instruments, 1802 West Grant Road, Suite 120, Tuscon, Arizona.

\* cited by examiner

Primary Examiner—Charles T. Jordan
Assistant Examiner—Tien Dinh
(74) Attorney, Agent, or Firm—Gates & Cooper LLP

(57) ABSTRACT

Structures and methods are provided for deriving corrected star coordinates $C_{crctd}$ from measured star coordinates $C_{ms}$ that include star tracker charge transfer efficiency (CTE) errors. The structures and methods are based on a recognition that measured star coordinates $C_{ms}$ of star image centroids include CTE errors which are functions of the CCD path lengths over which the associated electrical charges traveled. In particular, the errors are substantially a product of a respective path length and a star-coordinate error factor $\xi$ which, in turn, is a function of the star image magnitudes $m_{si}$. Information contained in different measured star coordinates $C_{ms}$ is organized to facilitate the derivation of an estimate $\xi^*$ of the star-coordinate error factor $\xi$ with conventional estimation processes. The measured star coordinates $C_{ms}$ are then corrected with the error factor estimate $\xi^*$ to realize the corrected star coordinates $C_{crctd}$ and, thereby, improve the accuracy of spacecraft attitude control.

24 Claims, 9 Drawing Sheets

SPACECRAFT METHODS AND SYSTEMS FOR AUTONOMOUS CORRECTION OF STAR TRACKER CHARGE-TRANSFER-EFFICIENCY ERRORS

GOVERNMENT RIGHTS

This invention was made with government support awarded by the government. The government has certain rights in this invention.

BACKGROUND OF THE INVENTION

1. Field of the Invention

The present invention relates generally to spacecraft and, more particularly, to spacecraft attitude control.

2. Description of the Related Art

A spacecraft typically has an attitude-control system for active control of the spacecraft's attitude and the attitude-control system often receives attitude-measurement signals from one or more star trackers. Star trackers generally process received star light through focusing optics to a solid state structure such as the structure 20 of FIG. 1A which includes an array 22 that defines a large number (e.g., >200,000) of pixels (23 in FIG. 1A) that each receive light into a respective photodiode which converts the incident light into a corresponding electrical charge.

The generated charge at each pixel is then transferred to an edge of the array 22 in a conveyor-belt-like fashion in which the charge moves between each pair of pixels via a charge-coupled device (CCD) that includes a transfer gate of an associated complementary-metal-oxide semiconductor (CMOS) device. Therefore, the array 20 is typically referred to as a CCD array. In addition, charges associated with the CCD array are collectively referred to as a frame and a readout of the frame is referred to as a frame readout or frame transfer.

An exemplary readout structure of generated charges has been shown and described (e.g., see Holst, Gerald C., *CCD Arrays, Cameras and Displays*, JCD Publishing, Winter Park, Fla., 1998, pp. 59–61) to have horizontally-arranged serial CCD registers 24 positioned at the upper and lower perimeters of the array 20. In this arrangement, the array is divided into four quadrants and each pixel charge of a quadrant is vertically transferred down a CCD column to a respective register 24.

Each time the respective register 24 is filled with the vertically-transferred charges, these charges are then horizontally transferred to a respective sense amplifier 26 which effectively forms an array output port 28. The sense amplifier typically includes a capacitor (e.g., formed by a floating diode) which converts each arriving electrical charge to a corresponding voltage which is then delivered to the output port 28 by the sense amplifier 26.

Although the readout structure of FIG. 1 realizes a rapid frame readout because it assigns a horizontal register 24 and corresponding sense amplifier 26 to each array quadrant, this structure adds to the array complexity. The above-cited reference, for example, also shows simpler readout structures such as one in which an upper half of the array 20 is served by a single upper register that has an output port at the array's upper right corner and a lower half is served by a single lower register that has an output port at the array's lower left corner.

FIG. 1B shows pixels 22 of the array 20 that are within an exemplary circle 1B of FIG. 1A. The light from a single star is typically focused on the array as a star image which generates electrical charges in a contiguous group of pixels 23 such as those within the star image 30 of FIG. 1B. The electrical charges will typically be quite small for pixels adjacent the perimeter of the star image 30 and progressively increase with distance from that perimeter. Star trackers generally include a processor that calculates a centroid 32 of the electrical charges within the star image 30 and it is the measured coordinates $C_{ms}$ of this star image centroid that are delivered through the array output ports (28 in FIG. 1A).

The star tracker readout process is susceptible to a number of errors. A first class of these errors concerns the addition of random noise (e.g., background and electronic) which induces temporal noise TN in the readout signals. Centroid jitter is generated as the star image moves across pixel boundaries and this jitter is a primary source of a second class of errors which are typically referred to as high spatial frequency errors $E_{hsf}$. Finally, low spatial frequency errors $E_{lsf}$ include calibration residuals, color shift errors and charge transfer efficiency (CTE) errors. Calibration residuals are caused by temperature-induced focal length shifts and color shift errors are caused by chromatic aberration in the focusing optics.

CTE errors are generated because the charge transfers of the array's CCD devices are not perfect but rather, are determined by the star tracker's CTE which is defined as the proportion $\epsilon$ of charges that are actually transferred from a trailing pixel to a leading pixel. Accordingly, a fraction 1-$\epsilon$ of charge is left behind in the trailing pixel. As explained in the above-cited reference, charge is not lost but charge is rearranged so that trailing pixels gain charge from leading pixels.

A transfer arrow 34 in FIG. 1C indicates that the charges within the initial star image 30 are in the process of being transferred downward. Because of the CTE-induced effect described above, the trailing edge 36 of the star image 30 has been extended and, as a result, the initial star image centroid 32 has been translated away from the leading edge 38 of the star image 30 to a subsequent position 32S. The difference between the initial and subsequent centroids 32 and 32S is a CTE error which is included in the measured star coordinate $C_{ms}$ that corresponds to the subsequent star image centroid 32S.

Typically, this CTE error is quite small. Scientific-grade star trackers, for example, have CTEs that exceed 0.999999 so that net transfers across thousands of CCDs (to the output ports 28 of FIG. 1A) are quite high (e.g., >0.99). In long term spacecraft missions, however, time and incident radiation generally degrade the CTE and this degradation may be sufficient to generate significant errors in a spacecraft's attitude control system and threaten the survival of the mission.

SUMMARY OF THE INVENTION

The present invention recognizes that measured star coordinates $C_{ms}$ of star image centroids include CTE errors which are functions of the CCD path lengths over which the associated electrical charges traveled. In particular, the errors are substantially a product of the path length and a star-coordinate error factor $\xi$ which, in turn, is a function of the star image magnitudes $m_{si}$. The invention further recognizes that information contained in different measured star coordinates $C_{ms}$ can be organized to facilitate the estimation of the star-coordinate error factor $\xi$ with conventional estimation processes.

From this recognition, the invention provides structures and methods for deriving corrected star coordinates $C_{crctd}$ from measured star coordinates $C_{ms}$ that include CTE errors and, accordingly, provides improved spacecraft attitude control systems.

In a method embodiment, CCD electrical charges are transferred over corresponding first and second paths of a CCD array at respective first and second times that differ by a measurement time interval $\delta t$ to thereby provide respective first and second measured star coordinates. The measured star coordinates are differenced to form measured star-coordinate differences $\delta C_{ms}$ and, in addition, a star-coordinate movement $\delta C$ due to rotation of the spacecraft over the measurement time interval $\delta t$ is determined.

With the measured star-coordinate differences $\delta C_{ms}$, the star-coordinate movement $\delta C$ and knowledge of a maximum path length $L_{max}$ in the CCD array, a composite coordinate-measurement signal $S_{ms_{comp}}$ is formed which substantially equals the sum of the error factor $\xi$ and a measurement variance $\sigma_{ms}$. The composite coordinate-measurement signal $S_{ms_{comp}}$ is processed in accordance with the star image magnitudes $m_{si}$ to derive an error factor estimate $\xi^*$ of the error factor $\xi$. Finally, the measured star coordinates $C_{ms}$ are corrected with the error factor estimate $\xi^*$ to thereby realize the corrected star coordinates $C_{crctd}$.

The novel features of the invention are set forth with particularity in the appended claims. The invention will be best understood from the following description when read in conjunction with the accompanying drawings.

DETAILED DESCRIPTION OF THE PREFERRED EMBODIMENTS

Figure 2:
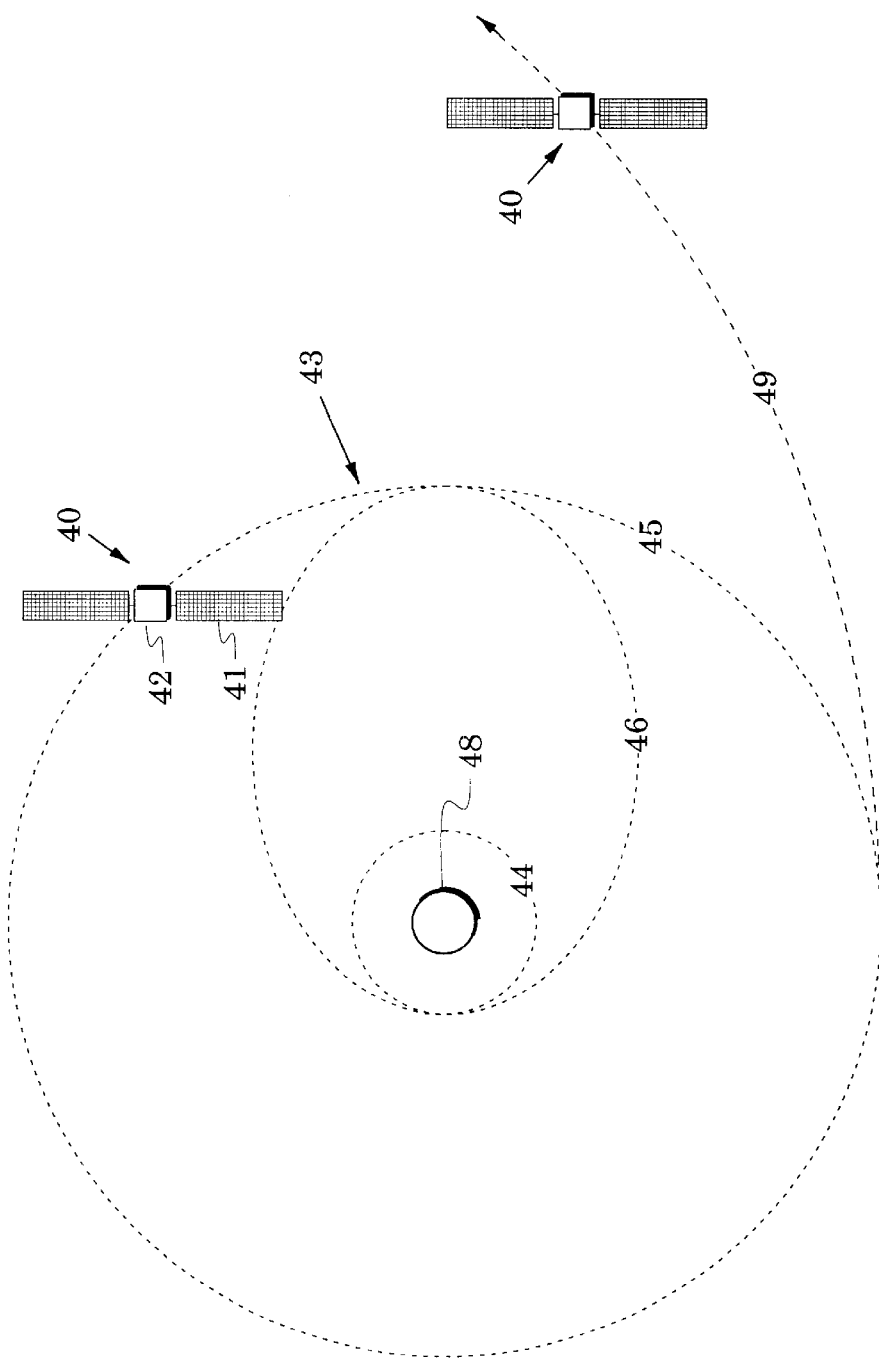
FIG. 2 is a view of a spacecraft whose attitude in various orbital and non-orbital paths may be determined with the aid of the CCD array of FIG. 1.

FIG. 2 illustrates a spacecraft 40 which has solar panels 41 coupled to a spacecraft body 42. The spacecraft is shown in association with various spacecraft orbital paths 43 (e.g., a parking orbit 44, a geosynchronous orbit 45 and a transfer orbit 46) about the Earth 48 and a non-orbital path 49 that is directed away from the Earth. As described above, CTE errors in the star trackers of the spacecraft 40 may be sufficient to degrade the spacecraft's attitude control system and endanger the spacecraft's mission.

Accordingly, the present invention is directed to the reduction of CTE errors in star tracker CCD arrays. It realizes this reduction by recognizing that CTE error in the measured star coordinate $C_{ms}$ of a star image centroid whose associated electrical charges traveled over an array path can be approximated as a product of the path length and a star-coordinate error factor. The invention further recognizes that information contained in different measured star coordinates $C_{ms}$ can be organized to facilitate the estimation of the star-coordinate error factor with conventional estimation processes.

Figures 1A, 1B, 1C:
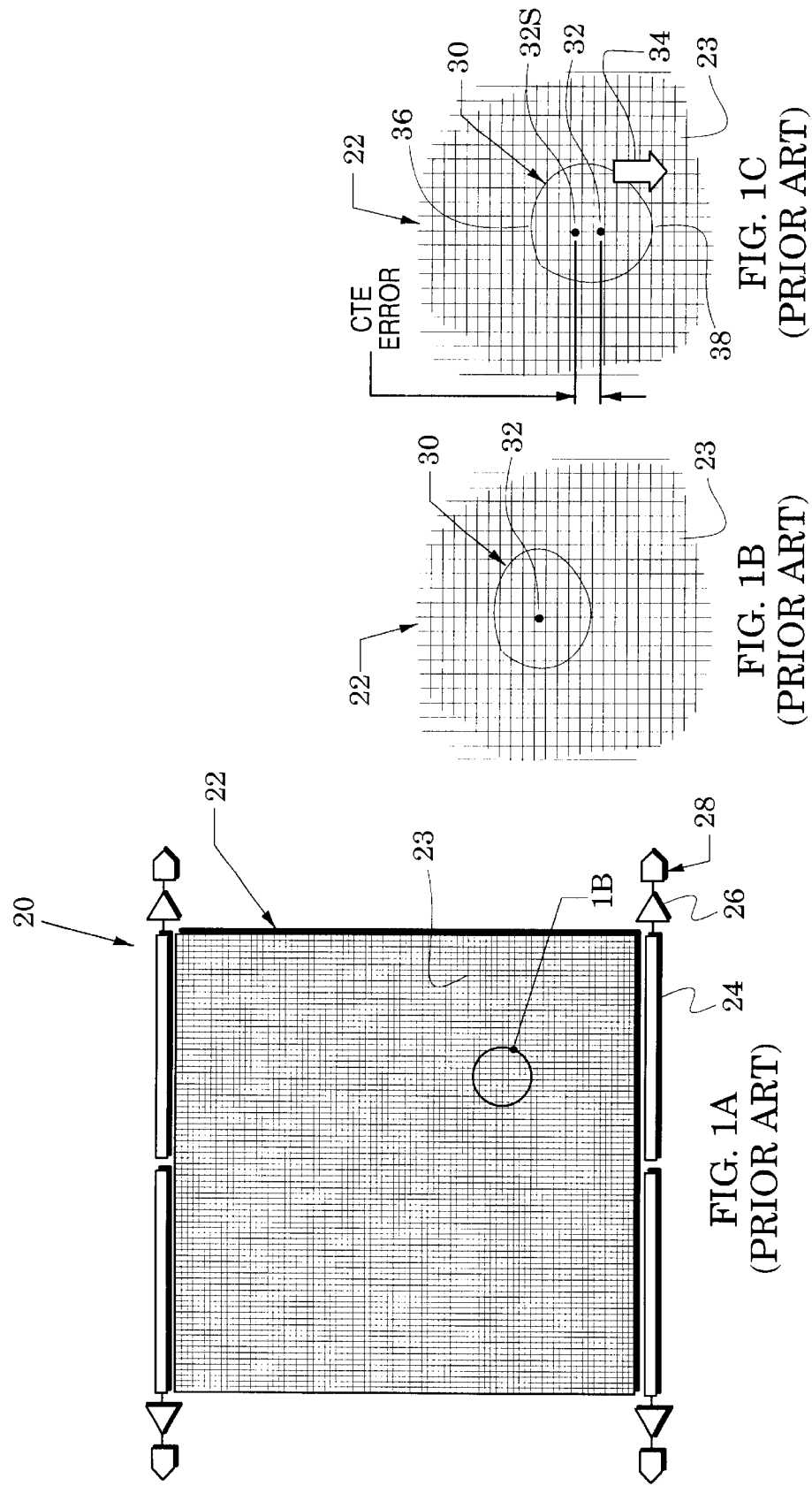
FIG. 1A is a front view of a conventional star tracker CCD array.
FIGS. 1B and 1C are enlarged views of pixels within the circle 1B of FIG. 1A which illustrate CTE-induced errors in star image centroids.
Figure 3:
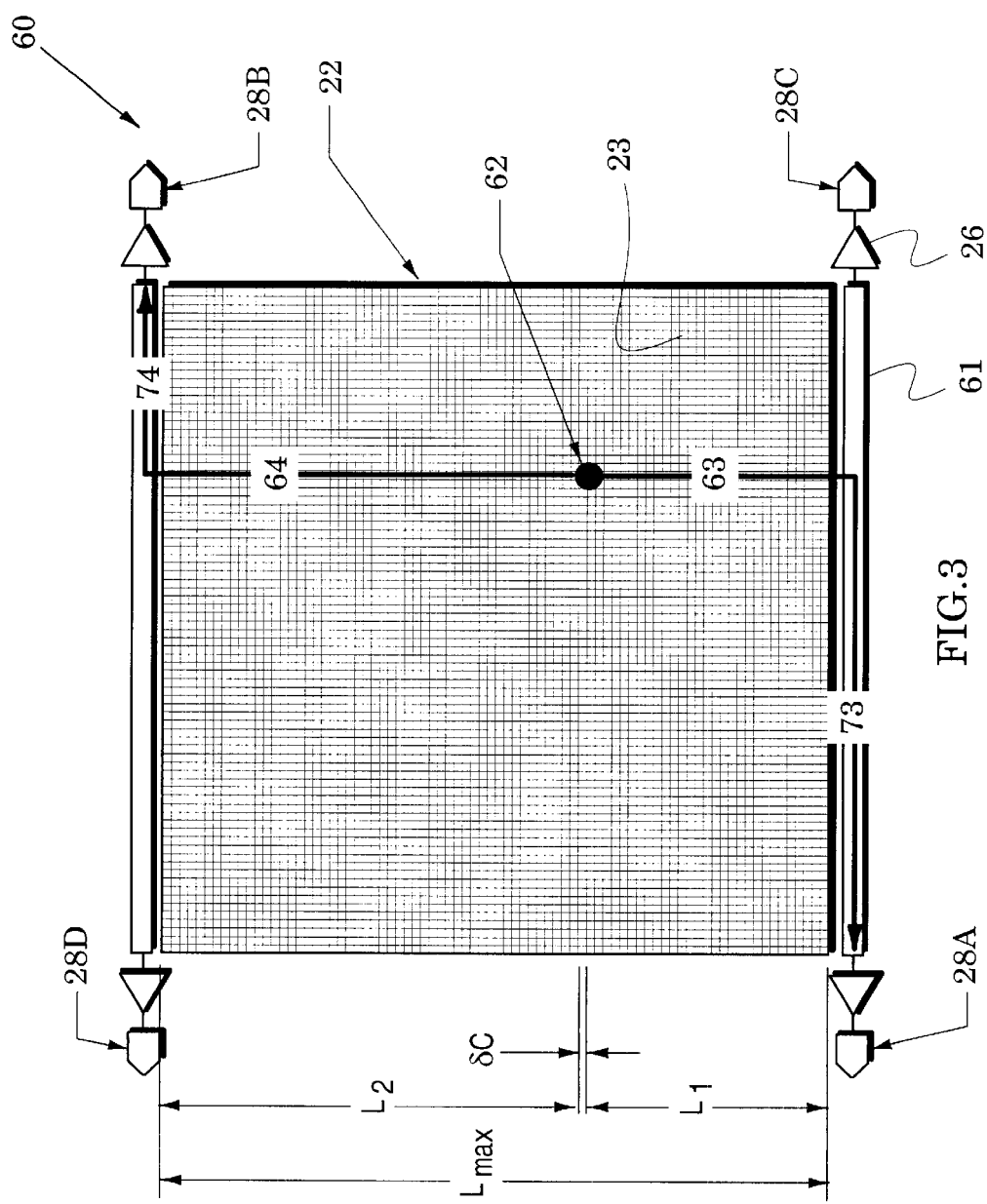
FIG. 3 is a CCD array view similar to that of FIG. 1 which illustrates electrical charge transference of the invention.

FIG. 3 illustrates a solid state structure 60 which is similar to the solid state structure 20 of FIG. 1 (with like elements indicated by like reference numbers) except the registers 24 have been replaced by full width registers 61. In FIG. 3, star light has been focused to form a star image 62 whose centroid has a true vertical star coordinate $C_{tr}$ on the CCD array 20. In accordance with the invention, the electrical charges associated with the star image 62 are transferred at a first time along a first array path 63 to a first array port 28A and provide a first measured vertical star coordinate $C_{ms_1}$. The invention recognizes that the first array path 63 has a first vertical path length $L_1$ and that an associated star-coordinate error factor $\beta$ will generate a readout error of $\beta L_1$ so that, $$C_{ms_1} = C_{tr_1} + \beta L_1 + E_{hsf} + E_{lsf} + TN \qquad (1)$$

wherein $C_{tr_1}$ is the true coordinate at the first time and $E_{hsf}$, $E_{lsf}$ and $TN$ are the high spatial frequency errors, low spatial frequency errors and temporal noise that have been previously described as other contributors to array readout errors (and wherein coordinates are referenced to the lower side of the array 20 so that upward errors are considered to be positive errors).

In a second frame readout at a second time that is delayed by a measurement time interval $\delta t$ from the first time, the electrical charges associated with the star image 62 are transferred along a second array path 64 to a second array port 28B and provide a second measured vertical star coordinate $C_{ms_2}$. The second array path has a second vertical path length $L_2$ which induces a readout error of $\beta L_2$ and, accordingly, $$C_{ms_2} = C_{tr_2} - \beta L_2 + E_{hsf} + E_{lsf} + TN \qquad (2)$$

wherein $C_{tr_2}$ is the true coordinate at the second time.

Differencing the first and second measured coordinates $C_{ms_1}$ and $C_{ms_2}$ produces, $$\delta C_{ms} = \delta C + \beta(L_1 + L_2) + \delta E_{hsf} + \delta E_{lsf} + \delta TN \qquad (3)$$

wherein the measured star-coordinate difference $\delta C_{ms}$ is the difference between the measured coordinates $C_{ms_1}$ and $C_{ms_2}$, the true vertical coordinate movement $\delta C$ is $C_{tr_1} - C_{tr_2}$ and represents movement of the true vertical coordinate due to rotation of the spacecraft over the measurement time interval $\delta t$ and the sum of $\delta E_{hsf}$, $\delta E_{lsf}$ and $\delta TN$ represent measurement noise over the measurement time interval $\delta t$.

If the height of the CCD array is $L_{max}$, then it is apparent that the first path length $L_1$ can be simply defined as the true vertical star coordinate $C_1$ at the first time and the second path length $L_2$ can be defined as $L_{max}$ less the true vertical star coordinate $C_2$ at the second time wherein the first and second times differ by the measurement time interval $\delta t$. Therefore, $L_1 + L_2 = L_{max} + \delta C$ and equation (3) can be rewritten as $$\delta C_{ms} = \delta C + \beta(L_{max} + \delta C) + \delta E_{hsf} + \delta E_{lsf} + \delta TN. \qquad (4)$$

In accordance with the present invention, equation (4) is organized to defined a composite coordinate-measurement signal $S_{ms_{comp}}$ in which $$S_{ms_{comp}} \equiv \frac{\delta C_{ms} - \delta C}{L_{max} + \delta C} = \beta + \frac{\delta E_{hsf} + \delta E_{hsf} + \delta TN}{L_{max} + \delta C} \quad (5)$$

$$S_{ms_{comp}} = \beta + \sigma_m^2$$

and the right hand term has been replaced by $\sigma_m^2$ because it represents a measurement variance $\sigma m^2$ (i.e., the coordinate measurement includes an error with a mean standard deviation $\sigma_m$). Equation (5) facilitates an estimation of the star-coordinate error factor $\beta$ and a subsequent correction of the measured coordinates $C_{ms}$ to realize corrected coordinates $C_{crctd}$ in which CTE errors have been substantially eliminated. It is noted that $L_1 + L_2 = L_{max}$ only when $\delta C = 0$ and, accordingly, FIG., 3 illustrates an exemplary situation in which $L_1 + L_2 \neq L_{max}$ because there has been a positive vertical coordinate movement $\delta C$ during the measurement time interval $\delta t$.

The teachings of the invention can be practiced with any readout sequence that facilitates formation of the measured star-coordinate differences $\delta C_{ms}$ of equation (3). For example, the charge transfers to the output ports 28A and 28B of FIG. 3 may be complemented with similar charge transfers to the output ports 28C and 28D with the readouts then differenced in any predetermined sequence to form measured star-coordinate differences $\delta C_{ms}$ such as that shown in equation (3). The readout and differencing is preferably performed to minimize the measurement time interval $\delta t$ between differenced readouts and to facilitate the associated computation processes.

In an exemplary sequence, frames of electrical charges are transferred in a sequence of ports 28A, 28B, 28C, 28D, 28A and so on and differencing of horizontal and vertical coordinates alternated. That is, horizontal coordinates from ports 28A and 28B differenced, vertical coordinates from ports 28B and 28C differenced, horizontal coordinates from ports 28C and 28D differenced and so on. In another exemplary sequence, frames of electrical charges are alternately transferred only to ports 28A and 28B with differencing of horizontal and vertical coordinates performed for each successive pair of readouts.

Charges associated with the star image 62 of FIG. 3 have been transferred over the vertical paths 63 and 64 and information from this transference has been organized in equation (5) to facilitate estimation of the error factor $\beta$. The star image charges have also been transferred over the horizontal paths 73 and 74 of FIG. 3. Because the CCD array 22 (and its associated registers 61) may exhibit different vertical and horizontal CTEs, information from this transference can also be organized (as taught above) to facilitate estimation of a horizontal error factor $\alpha$. In order to enhance description simplicity and understanding of the invention, the following descriptions are often expressed in terms of a generalized error factor $\xi$ with the understanding that it may, in practice, comprise particular error factors (e.g., the horizontal and vertical error factors $\alpha$ and $\beta$). In terms of this generalized error function, the organization of equation (5) becomes $$S_{ms_{comp}} \equiv \frac{\delta C_{ms} - \delta C}{L_{max} + \delta C} = \xi + \frac{\delta E_{hsf} + \delta E_{hsf} + \delta TN}{L_{max} + \delta C} \quad (6)$$

$$S_{ms_{comp}} = \xi + \sigma_m^2.$$

CTE is not constant but rather, it changes as a function of various parameters which include charge intensity and temperature. Temperature can be controlled but charge intensity is dependent upon star magnitudes and their corresponding star images. Accordingly, the invention recognizes that the star-coordinate error factor $\xi$ is a complex function of the star image magnitude $m_{si}$ and is preferably expressed in terms of base functions such as polynomials.

Figure 4:
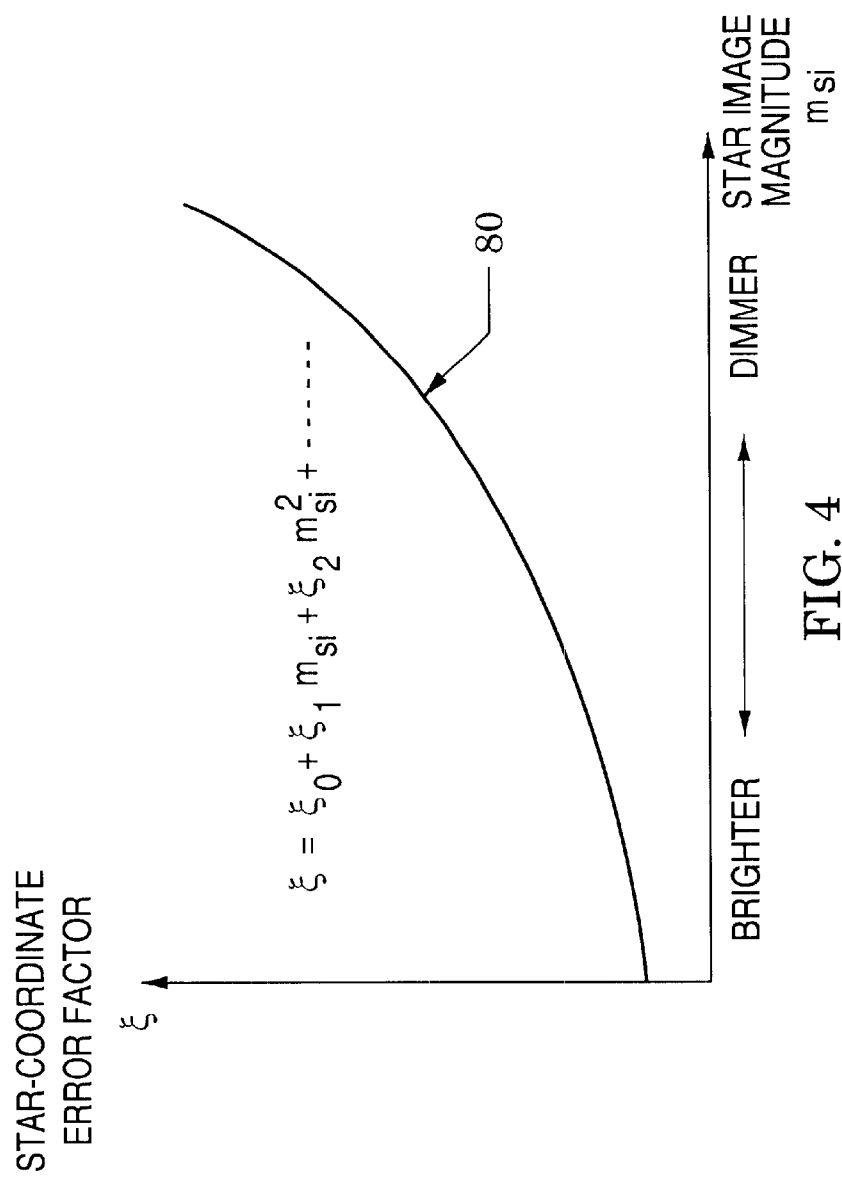
FIG. 4 is a plot of a star-coordinate error factor of the invention as a function of star image magnitudes in the CCD array of FIG. 3.

FIG. 4 illustrates an exemplary plot 80 of the error factor $\xi$ as a function of star image magnitude $m_{si}$. It is noted that the error factor $\xi$ generally decreases with reduced star image magnitude (corresponding to a brighter star) because of CCD limitations (e.g., surface state interactions). FIG. 4 provides an expression in which the error factor of the plot 80 is expressed as a polynomial with star image magnitude $m_{si}$ as a variable and with coefficients $\xi_n$ that are appropriately selected to construct the plot 80. Although the plot 80 of FIG. 4 can be adequately defined with constant, linear and quadratic polynomial terms, additional terms (e.g., cubic) may be needed to express more complex error factor plots.

Figure 5:
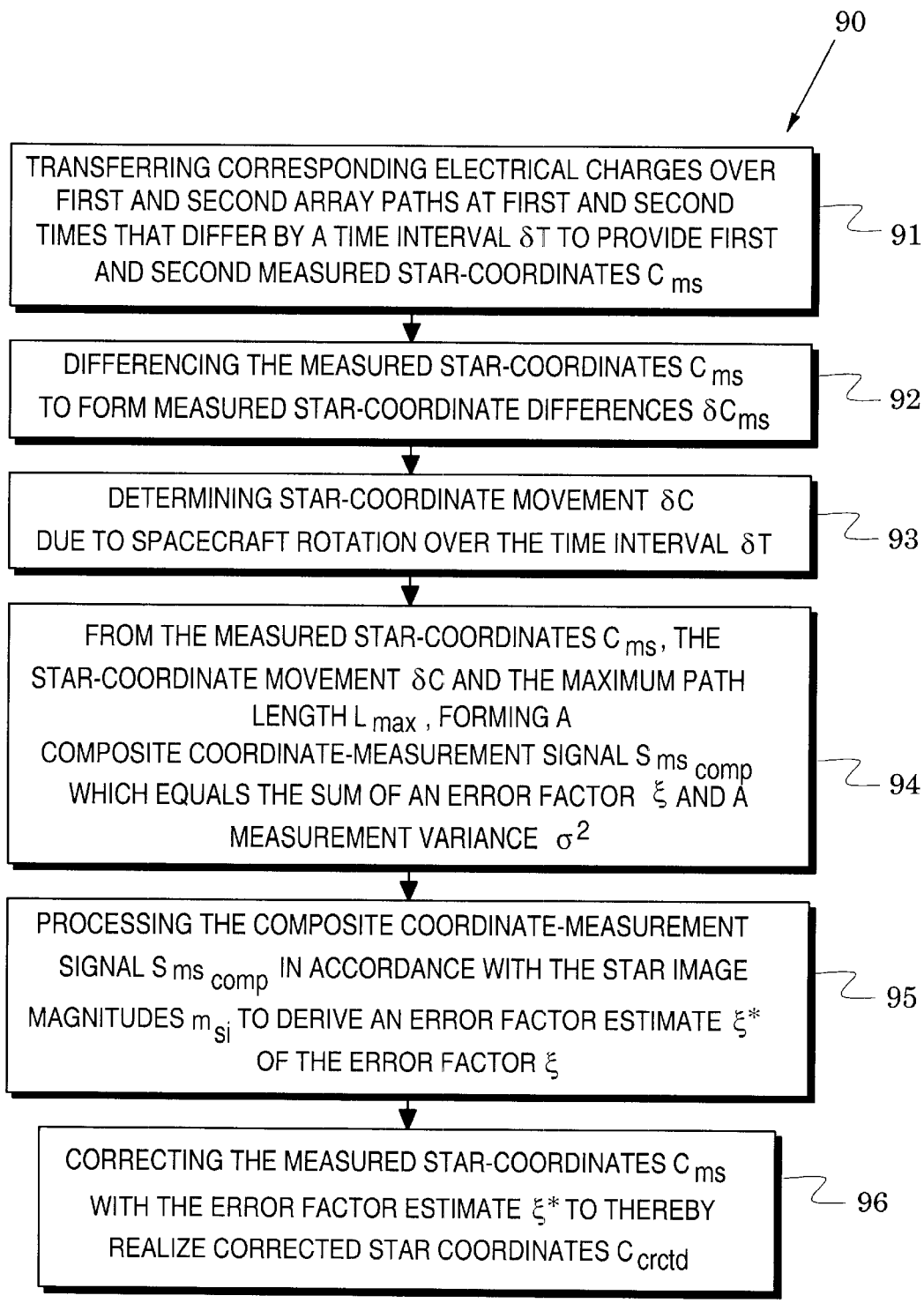
FIG. 5 is a flow diagram that illustrates process steps of the invention.
Figure 6:
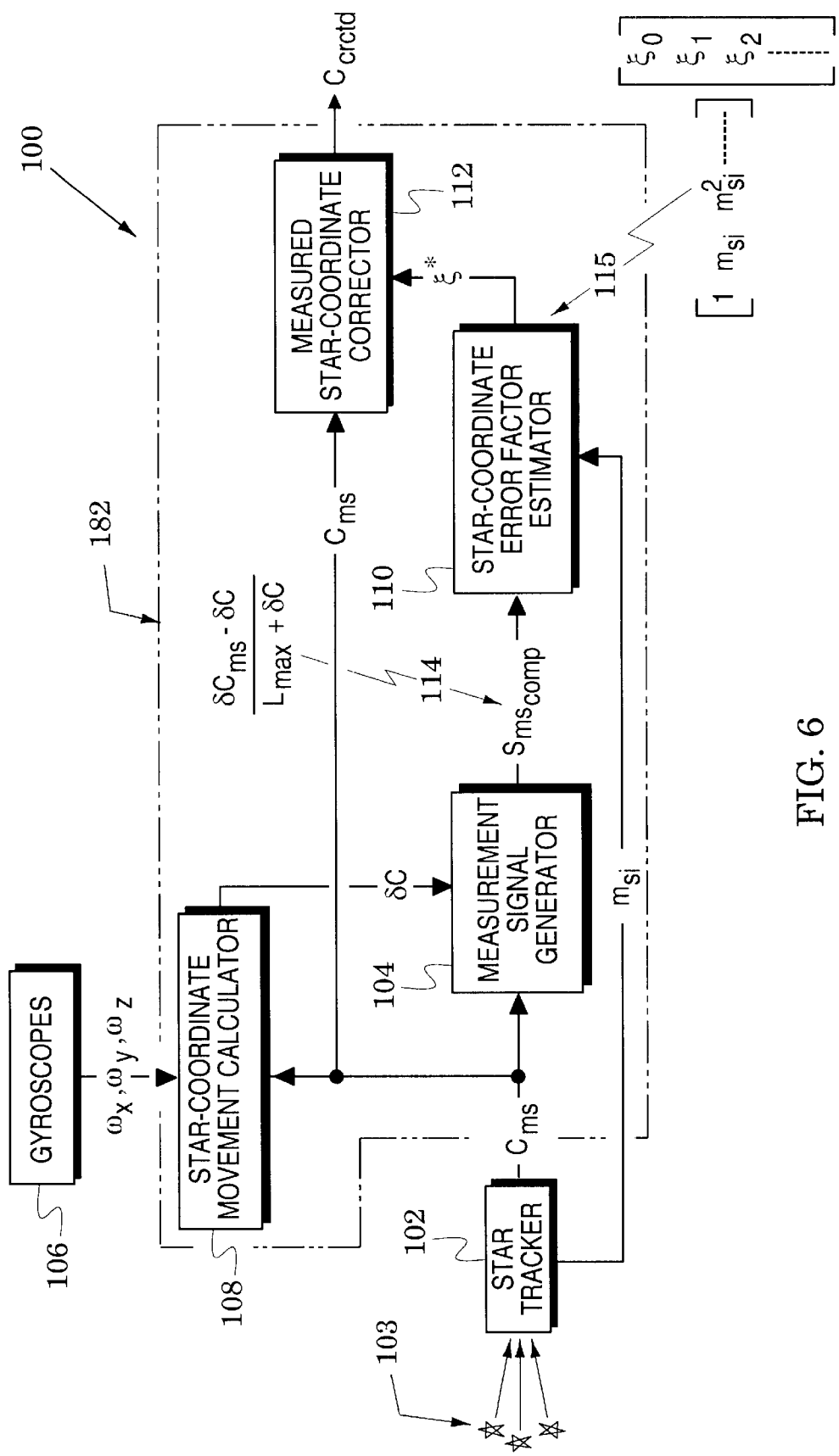
FIG. 6 is a block diagram of a coordinate-correction system that practices the process steps of FIG. 5.

FIG. 5 is a flow diagram 90 which recites process steps of the invention and FIG. 6 shows a coordinate-correction system 100 that practices the process steps of FIG. 5. The process steps form a method for deriving corrected star coordinates $C_{crctd}$ from measured star coordinates $C_{ms}$ that include CTE errors wherein the corrected star coordinates $C_{crctd}$ improve attitude determination of a spacecraft.

The first process step 91 is performed in response to each of a plurality of star images that are focused on a CCD array and this step transfers corresponding electrical charges over corresponding first and second paths of the CCD array at respective first and second times that differ by a measurement time interval $\delta t$ to thereby provide respective first and second measured star coordinates $C_{ms_1}$, $C_{ms_2}$.

In accordance with the invention, these measured star coordinates include errors that are substantially proportional to products of the lengths of their respective paths and an initially unknown star-coordinate error factor $\xi$. The CCD array has a maximum path length $L_{max}$ and, as previously noted, the error factor $\xi$ is a function of star image magnitudes $m_{si}$. The first process step is realized in FIG. 6 with a star tracker 102 that focuses light from stars 103 onto a CCD array and transfers these charges to star tracker output ports to generate the measured star-coordinates $C_{ms}$.

In a second process step 92 of FIG. 5, the measured star coordinates $C_{ms}$ are differenced to form measured star-coordinate differences $\delta C_{ms}$. This step is performed by a measurement signal generator 104 in FIG. 6. Process step 93 determines star-coordinate movement $\delta C$ due to rotation of the spacecraft over the measurement time interval $\delta t$. Rotation signals (or rotation rate signals) are provided by gyroscopes 106 in FIG. 6 (e.g., the rotation signals $\omega$ are measured in a spacecraft coordinate frame of roll axis x, yaw axis y and pitch axis z). The rotation or rotation rate signals $\omega$ are processed in conventional manners in a star-coordinate movement computer 108 to determine the star-coordinate movement $\delta C$.

In response to the measured star-coordinate differences $\delta C_{ms}$, the star-coordinate movement $\delta C$ and the maximum path length $L_{max}$, the composite coordinate-measurement signal $S_{ms_{comp}}$ of equation (6) is formed in process step 94 of FIG. 5. As shown above in equation (6), this composite measurement signal substantially equals the sum of the error factor $\xi$ and the measurement variance $\sigma_{ms}^2$. This processing step is realized in the measurement signal generator 104 of FIG. 6.

In step 95 of FIG. 5, the composite coordinate-measurement signal $S_{ms_{comp}}$ is processed in accordance with the star image magnitudes $m_{si}$ to derive the error factor estimate $\xi^*$ of the error factor $\xi$. This step is performed in FIG. 6 by the star-coordinate error factor estimator 110. Finally, in process step 96, measured star coordinates $C_{ms}$ are corrected with the error factor estimate $\xi^*$ (by appropriately adding or subtracting products of the error factor estimate $\xi^*$ and the corresponding path lengths which are given by the measured coordinates $C_{ms}$) to thereby realize the corrected star coordinates $C_{crctd}$. This step is performed by a measured star-coordinate corrector 112 in FIG. 6.

As described above in equation (6) and as indicated by substitution arrow 114 in FIG. 6, the composite coordinate-measurement signal $S_{ms_{comp}}$ is defined as $(\delta C_{ms}-\delta C)/(L_{max}+\delta C)$. Although the process steps of FIG. 5 can be realized with dedicated structural elements 104, 108, 110 and 112 of FIG. 6, the steps are preferably performed with an appropriately-programmed data processor. The programming is preferably structured in a matrix form in which the star-coordinate error factor $\xi$ of FIG. 4 is represented as the product of a row vector of variables $m_{si}$ and a column vector of coefficients $\xi_n$ as shown by the substitution arrow 115 in FIG. 6.

It was stated above that the process step 95 of FIG. 5 is performed by the star-coordinate error factor estimator 110. The estimator is preferably realized with various conventional estimating methods, e.g., batch least squares estimators and recursive least squares estimators. A exemplary batch least squares estimator provides a state estimate at current time using a batch of composite coordinate-measurement signals taken during a fixed time span. A sequential least squares estimator updates the state estimate once the composite coordinate-measurement signal is made at the current time.

Figure 7:
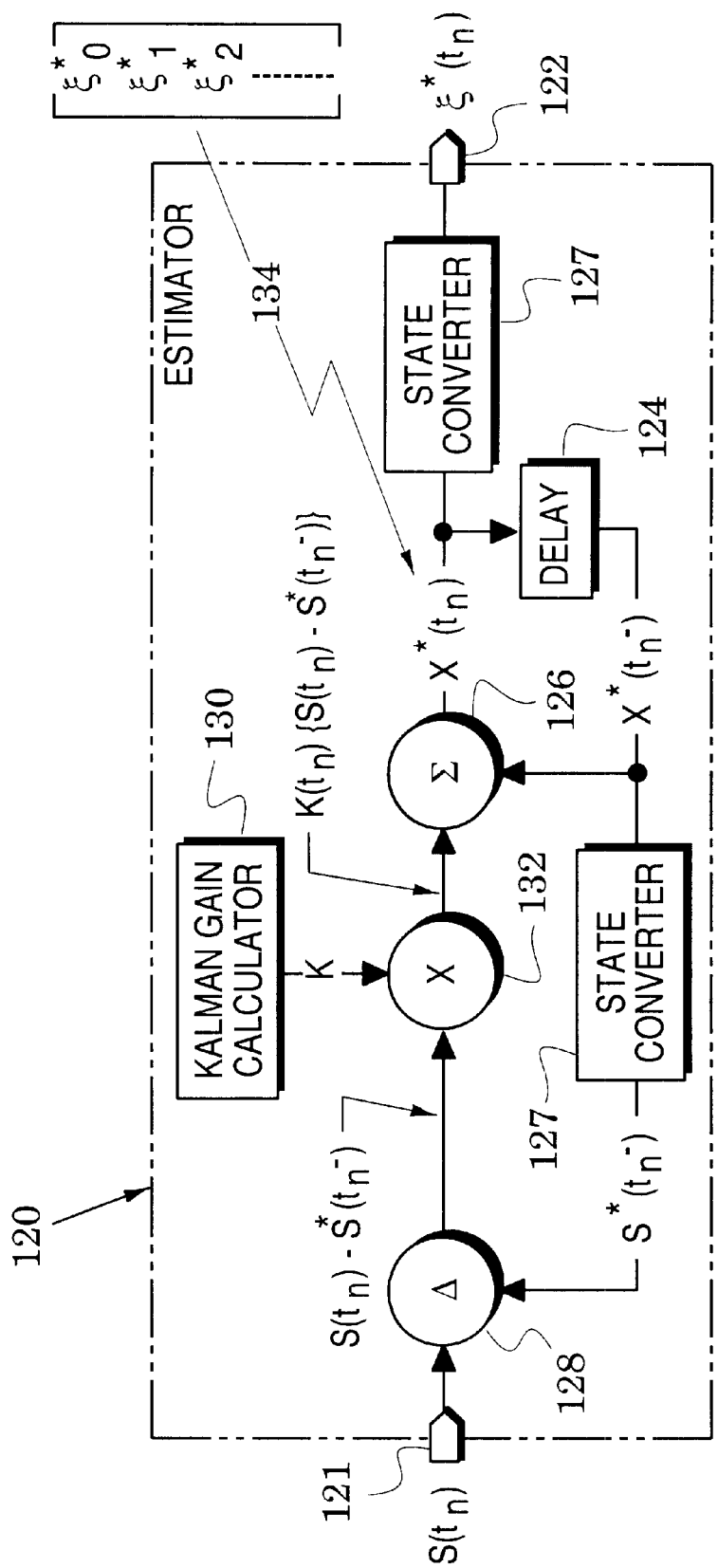
FIG. 7 is a block diagram of a star-coordinate error factor estimator in the system of FIG. 6.

FIG. 7 illustrates an exemplary recursive processor in the form of a Kalman filter 120 which provides the error factor estimate $\xi^*$ at an output port 122 in response to the composite coordinate-measurement signal $S_{ms_{comp}}$ at an input port 121. The Kalman filter 120 utilizes a weighting function, called the Kalman gain K, which is optimized to produce a minimum estimate variance $\sigma_e^2$ (i.e., the accuracy of the error factor estimate $\xi^*$ is maximized). In particular, the Kalman filter 120 combines a current composite measurement signal $S(t_n)$ with measurement predictions $S^*(t_n^-)$ that are based on past measurements (and thus apply to a time $t_n^-$ just before $t_n$) to provide a state estimate $X^*(t_n)$ at a time $t_n$ just after the time $t_n^-$. As indicated by the subscript n, the filter successively and recursively combines the measurements and measurement predictions to obtain an estimate with a minimum estimate variance $\sigma_e^2$ (i.e., maximum accuracy). The current composite measurement signal $S(t_n)$ is the composite coordinate-measurement signal $S_{ms_{comp}}$ of FIG. 6.

This process is summarized in a state estimate update equation $$X^*(t_n)=X^*(t_n^-)+K(t_n)\{S(t_n)-S^*(t_n^-)\} \quad (7)$$

in which a state estimate prediction $X^*(t_n^-)$ just before the measurement $S(t_n)$ is updated by a portion $K(t_n)$ of a residue which is the difference between the composite measurement $S(t_n)$ and a measurement prediction $S^*(t_n^-)$. The product of the gain and the residue is a correction $K(t_n)\{S(t_n)-S^*(t_n^-)\}$ which corrects the state estimate prediction $X^*(t_n^-)$ to form a state estimate update $X^*(t_n)$ for a time $t_n$ just after the signal measurement $S(t_n)$ was provided. The portion $K(t_n)$ is the Kalman gain which is calculated as $$K(t_n)=\sigma_e^2(t_n^-)/\{\sigma_e^2(t_n^-)+\sigma_m^2\} \quad (8)$$

in which $\sigma_e^2(t_n^-)$ is the estimate variance just before the measurement signal $S(t_n)$ and $\sigma_m^2$ is the measurement variance of equation (6) above. The estimate variance is recursively updated in accordance with $$\sigma_e^2(t_n)=\{1-K(t_n)\}\sigma_e^2(t_n^-). \quad (9)$$

In the beginning of the recursive process, the estimate variance is generally much greater than the measurement variance so that the gain $K(t_n)$ approaches one. As the process continues, the estimate variance $\sigma_e^2$ is reduced below the measurement variance $\sigma_m^2$ so that the gain $K(t_n)$ declines to a value much less than one. It is apparent from equation (7), therefore, that a large portion of the residue $S(t_n)-S^*(t_n^-)$ is initially used to update the state estimate prediction $X^*(t_n^-)$ into the updated state estimate $X^*(t_n)$ but this portion decreases as the process continues. It has been shown that the estimate variance can be expressed as $\sigma_m^2/n$ and thus, it asymptotically approaches zero as more composite signal measurements are obtained.

In the Kalman filter 120 of FIG. 7, the updated state estimate $X^*(t_n)$ is passed through a time delay 124 to form the state estimate prediction $X^*(t_n^-)$ and provide it to a summer 126. The state estimate prediction is also passed through a state converter 127 to form the measurement prediction $S^*(t_n^-)$ which is differenced in a differencer 128 with the composite measurement $S(t_n)$ to generate the residue $S(t_n)-S^*(t_n)$.

The Kalman gain $K(t_n)$ is provided by a Kalman gain calculator 130 which performs equations (8) and (9). The residue $S(t_n)-S^*(t_n^-)$ and gain $K(t_n)$ are multiplied in a multiplier 132 to generate the correction $K(t_n)\{S(t_n)-S^*(t_n)\}$ which is summed with the state estimate prediction $X^*(t_n^-)$ in the summer 126 to realize the state estimate $X^*(t_n)$.

The state estimate $X^*(t_n)$ is then processed through another state converter 127 to provide the error factor estimate $\xi^*(t_n)$ at the output port 122. The state converters 127 use relationships (e.g., as shown by the substitution arrow 115 in FIG. 6) to convert the state estimate $\xi^*(t_n)$ into the error factor estimate $t^*(t_n)$. As shown by substitution arrow 134, for example, the state estimate is represented by a column vector of coefficient estimates and the state converter multiplies this column vector with the row vector of FIG. 6 to generate the scalar error factor estimate $\xi^*(t_n)$.

Figure 8C:
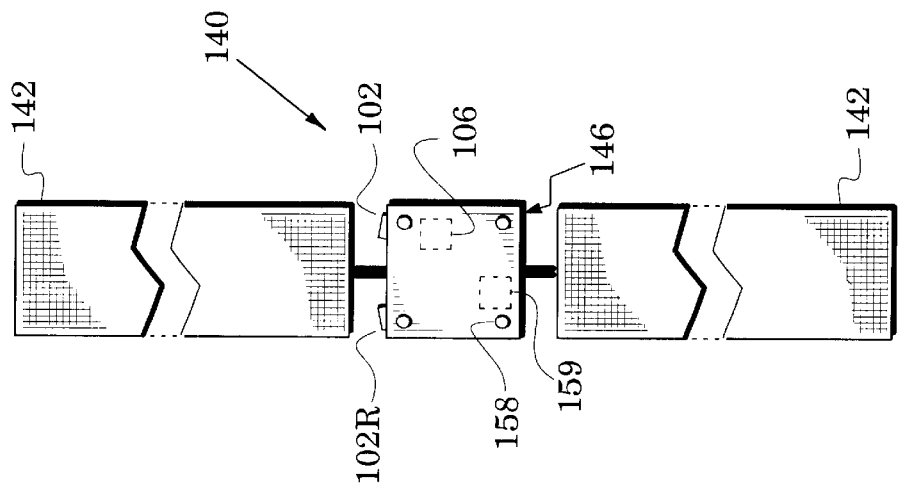
FIGS. 8A–8C comprise views of a spacecraft for practicing the invention.
Figure 8B:
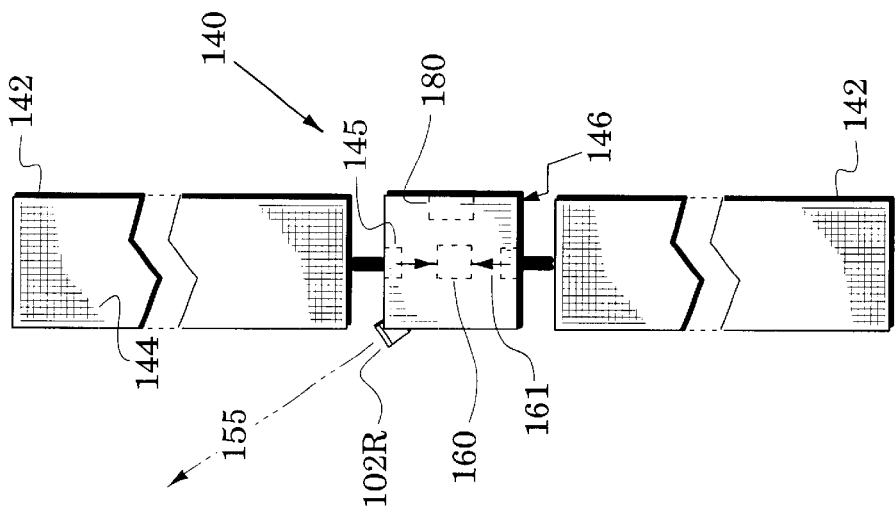
Figure 8A:
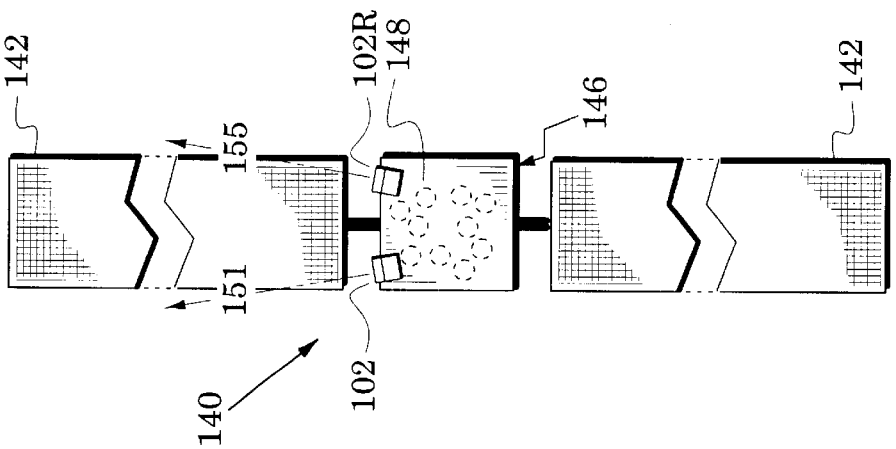
Figure 9:
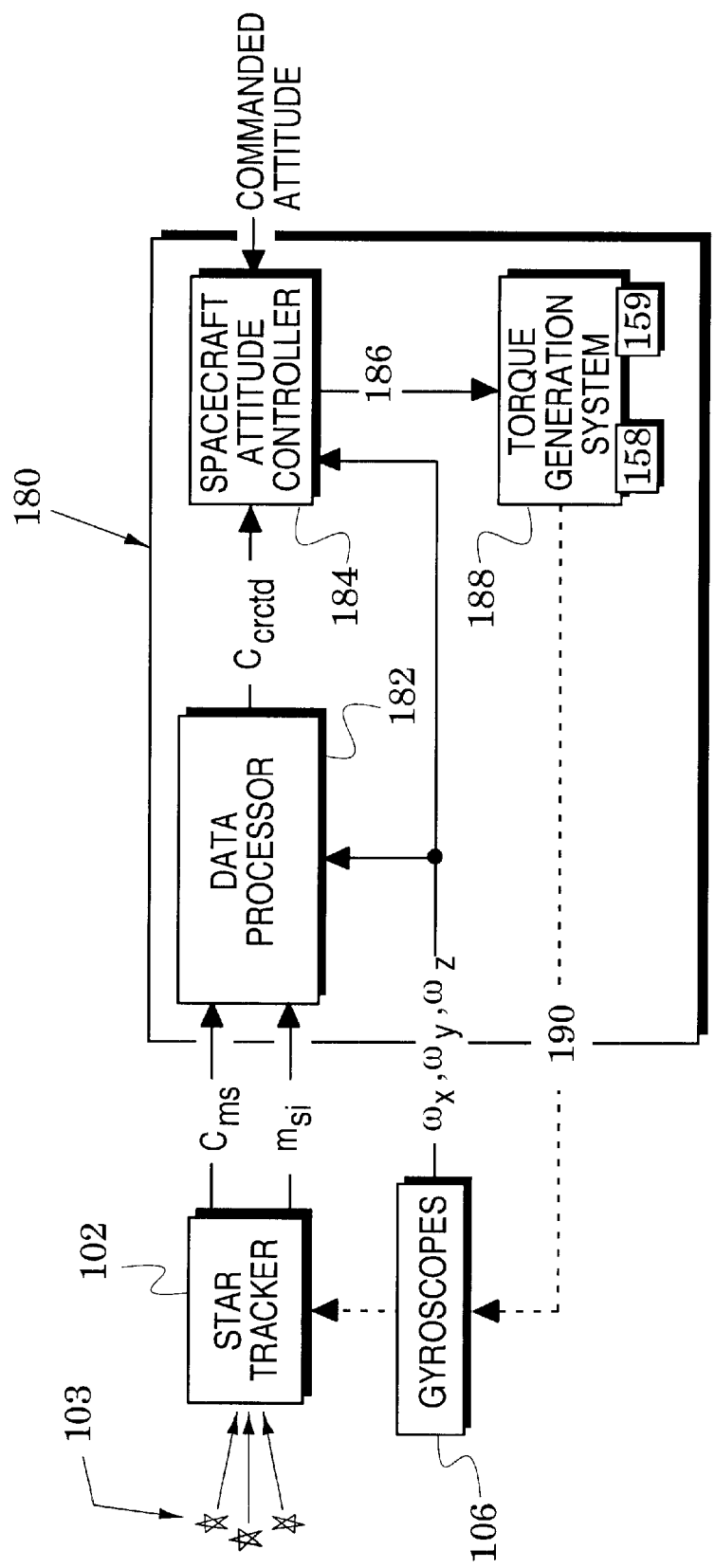
FIG. 9 is a block diagram of an attitude control system in the spacecraft of FIG. 8.

An exemplary spacecraft 140 for practicing the methods of the invention is illustrated in FIGS. 8A–8C and an attitude-control system 180 of the spacecraft is illustrated in FIG. 9. The spacecraft has solar panels 142 that carry arrays 144 of solar cells and extend from rotary actuators 145 on opposite sides of a spacecraft body 146. The body 146 carries a plurality of communication equipment and communication antennas 148 which are oriented towards a target (e.g., the Earth) when the spacecraft is in its service attitude.

A primary star tracker 102 (also shown in FIG. 6) is carried on the body 146 and, as described above, includes a charge-coupled device (CCD) detector with a field-of-view (e.g., 8°×8°) that is centered on a boresight 151. Although the primary star tracker is sufficient for practicing the methods of the invention, it is preferably backed up with a redundant star tracker 102R that has a boresight 155.

The boresight arrangements of the star trackers are chosen to reduce intrusion of other spacecraft portions (e.g., solar wings, and antennas) into their fields-of-view. They are also chosen to reduce intrusion of local celestial bodies (e.g., the Earth, sun and moon) into their fields-of-view when the spacecraft is in its service attitude.

The gyroscopes 106 of FIG. 6 are carried by the spacecraft body 146 to provide rotation or rotation rate signals. The body 146 also carries torque generators for correcting the spacecraft's attitude. Exemplary generators include thrusters 158 and internal momentum wheels 159.

The body 146 carries a power control module 160 which responds to current 161 from the solar panels 142 by generating electrical power for operation of the spacecraft. The body also carries the attitude control system 180 of FIG. 9 which receives attitude signals from the star trackers 102 and 102R and directs the torque generators to control the spacecraft's attitude.

In FIG. 9, light from stars 103 is focused onto a CCD array of the star tracker 102 and and corresponding electrical charges are transferred to star tracker output ports to generate the measured star-coordinates $C_{ms}$. The star tracker 102 also provides star image magnitudes $m_{si}$ and these and the measured star-coordinates $C_{ms}$ are coupled to a data processor 182 of the attitude-control system 180 which is programmed to perform the processes of the flow chart 90 of FIG. 5. That is, the data processor performs the processes of the modules within the broken line 182 of FIG. 6. In addition, the gyroscopes 106 of FIG. 6 provide rotation or rotation rate signals $\omega$ to the data processor 182.

From the measured star-coordinates $C_{ms}$ and, the star image magnitudes $m_{si}$ and the rotation signals $\omega$, the data processor 182 derives the corrected coordinates $C_{crctd}$ which it delivers to an attitude controller 184. In response to the corrected coordinates $C_{crctd}$ and to a commanded attitude (from internal or external sources), the attitude controller couples attitude control signals 186 to a torque generation system 188 which includes, for example, the thrusters 158 and momentum wheels 159 of FIGS. 8A–8C.

In response the torque generation system applies torques to the spacecraft (140 in FIGS. 8A–8C) which correct its attitude to the commanded attitude. This attitude change is coupled to be sensed by the gyroscopes 106 and the star tracker 102 as indicated by the broken attitude line 190.

The invention recognizes that a readout path length L and an associated star-coordinate error factor $\xi$ will generate a readout error of $\xi L$ in conventional star trackers. The invention provides structures and processes that facilitate the derivation and estimation of the star-coordinate error factor $\xi$ and the subsequent correction of measured measured coordinates $C_{ms}$ to thereby realize corrected coordinates $C_{crctd}$. In embodiments of the invention, the generalized star-coordinate error factor $\xi$ may take specific forms (e.g., horizontal and vertical error factors $\alpha$ and $\beta$) that are appropriate for those embodiments.

The preferred embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A method of deriving corrected star coordinates $C_{crctd}$ from measured star coordinates $C_{ms}$ that include charge transfer efficiency (CTE) errors wherein said corrected star coordinates $C_{crctd}$ improve attitude determination and control of a spacecraft, the method comprising the steps of:

in response to each of a plurality of star images focused on a charge-coupled device (CCD) array, transferring corresponding electrical charges over corresponding first and second paths of said CCD array at respective first and second times that differ by a measurement time interval $\delta t$ to thereby provide respective first and second measured star coordinates $C_{ms_1}$, $C_{ms_2}$ that include errors substantially proportional to products of the lengths of their respective paths and an unknown star-coordinate error factor $\xi$ wherein said error factor $\xi$ is a function of star image magnitudes $m_{si}$ of said star images and wherein said CCD array has a maximum path length $L_{max}$;

differencing said measured star coordinates $C_{ms}$ to form measured star-coordinate differences $\delta C_{ms}$;

determining star-coordinate movement $\delta C$ due to rotation of said spacecraft over said measurement time interval $\delta t$;

with said measured star-coordinate differences $\delta C_{ms}$, said star-coordinate movement $\delta C$ and said maximum path length $L_{max}$, forming a composite coordinate-measurement signal $S_{ms_{comp}}$ which substantially equals the sum of said error factor $\xi$ and a measurement variance $\sigma_{ms}$;

processing said composite coordinate-measurement signal $S_{ms_{comp}}$ in accordance with said star image magnitudes $m_{si}$ to derive an error factor estimate $\xi^*$ of said error factor $\xi$; and correcting said measured star coordinates $C_{ms}$ with said error factor estimate $\xi^*$ to thereby realize said corrected star coordinates $C_{crctd}$.

2. The method of claim 1, wherein said maximum path length $L_{max}$ is substantially equal to the sum of the lengths of said first and second paths.

3. The method of claim 1, wherein:

said CCD array is arranged so that said maximum path length $L_{max}$ comprises maximum horizontal and vertical path lengths $L_{max_{hrznl}}$ and $L_{max_{vtcl}}$;

said transferring step includes the step of transferring said electrical charges over corresponding first and second horizontal paths of said CCD array and over corresponding first and second vertical paths of said CCD array; and said error factor $\xi$ comprises a horizontal error factor $\alpha$ and a vertical error factor $\beta$.

4. The method of claim 1, wherein said determining step includes the steps of:

receiving rotation rate signals from a set of spacecraft gyroscopes; and deriving said star-coordinate movement $\delta C$ from said rotation rate signals.

5. The method of claim 1, wherein said composite coordinate-measurement signal $S_{ms_{comp}}$ comprises the quantity $(\delta C_{ms} - \delta C)/(L_{max} + \delta C)$.

6. The method of claim 1, wherein said measurement variance $\sigma_{ms}$ comprises high spatial frequency error $\delta E_{hsf}$, low spatial frequency error $\delta E_{lsf}$ and temporal noise $\delta TN$ of said CCD array.

7. The method of claim 6, wherein said measurement variance $\sigma_{ms}$ comprises the quantity $(\delta E_{hsf} + \delta E_{lsf} + \delta TN)/(L_{max} + \delta C)$.

8. The method of claim 1, wherein said star-coordinate error factor estimate $\xi^*$ is a least squares estimate of said star-coordinate error factor $\xi$.

9. The method of claim 8, wherein said deriving step includes the step of batch generating a least squares estimate of said error factor estimate $\xi^*$.

10. The method of claim 8, wherein said deriving step includes the step of recursively generating a least squares estimate of said error factor estimate $\xi^*$.

11. The method of claim 10, wherein said generating step includes the step of Kalman filtering said composite coordinate-measurement signal $S_{ms_{comp}}$ to realize said error factor estimate $\xi^*$.

12. A spacecraft whose attitude control is improved with corrected star coordinates $C_{crctd}$ that are derived from measured star coordinates $C_{ms}$ which include charge transfer efficiency (CTE) errors, the spacecraft comprising:

a spacecraft body;

at least one star tracker that is coupled to said body and has a charge-coupled device (CCD) array arranged to receive focused star light and, in response, generate a plurality of star images;

at least one gyroscope that is coupled to said body for generating rotation rate signals;

a torque generator coupled to generate torques in said body in response to torque command signals;

a data processor programmed to perform the steps of:
  a) in response to each of said star images, transferring corresponding electrical charges over corresponding first and second paths of said CCD array at respective first and second times that differ by a measurement time interval $\delta t$ to thereby provide respective first and second measured star coordinates $C_{ms_1}$, $C_{ms_2}$ that include errors substantially proportional to products of the lengths of their respective paths and an unknown star-coordinate error factor $\xi$ wherein said error factor $\xi$ is a function of star image magnitudes $m_{si}$ of said star images and wherein said CCD array has a maximum path length $L_{max}$;
  b) differencing said measured star coordinates $C_{ms}$ to form measured star-coordinate differences $\delta C_{ms}$;
  c) in response to said rotation rate signals, determining star-coordinate movement $\delta C$ due to rotation of said spacecraft over said measurement time interval $\delta t$;
  d) from said measured star-coordinate differences $\delta C_{ms}$, said star-coordinate movement $\delta C$ and said maximum path length $L_{max}$, forming a composite coordinate-measurement signal $S_{ms_{comp}}$ which substantially equals the sum of said error factor $\xi$ and a measurement variance $\sigma_{ms}$;
  e) in response to said composite coordinate-measurement signal $S_{ms_{comp}}$ and to said star image magnitudes $m_{si}$, deriving an error factor estimate $\xi^*$ of said error factor $\xi$; and
  f) correcting said measured star coordinates $C_{ms}$ with said error factor estimate $\xi^*$ to thereby realize said corrected star coordinates $C_{crctd}$;

and an attitude controller that generates said torque command signals in response to said corrected star coordinates $C_{crctd}$ and said rotation rate signals.

13. The spacecraft of claim 12, wherein said maximum path length $L_{max}$ is substantially equal to the sum of said first and second paths.

14. The spacecraft of claim 12, wherein:
  said CCD array is arranged to to have maximum horizontal and vertical path lengths $L_{max_{hrzntl}}$ and $L_{max_{vtcl}}$;
  said transferring step includes the step of transferring said electrical charges over corresponding first and second horizontal paths of said CCD array and over corresponding first and second vertical paths of said CCD array; and
  said error factor $\xi$ comprises a horizontal error factor $\alpha$ and a vertical error factor $\beta$.

15. The spacecraft of claim 12, wherein said determining step includes the steps of:
  receiving rotation rate signals from a set of spacecraft gyroscopes; and
  deriving said star-coordinate movement $\delta C$ from said rotation rate signals.

16. The spacecraft of claim 12, wherein said composite coordinate-measurement signal $S_{ms_{comp}}$ comprises the quantity $(\delta C_{ms} - \delta C)/(L_{max} + \delta C)$.

17. The spacecraft of claim 12, wherein said measurement variance $\sigma_{ms}$ comprises high spatial frequency error $\delta E_{hsf}$, low spatial frequency error $\delta E_{lsf}$ and temporal noise $\delta TN$ of said CCD array.

18. The spacecraft of claim 17, wherein said measurement variance $\sigma_{ms}$ comprises the quantity $(\delta E_{hsf} + \delta E_{lsf} + \delta TN)/(L_{max} + \delta C)$.

19. The spacecraft of claim 12, wherein said star-coordinate error factor estimate $\xi^*$ is a least squares estimate of said star-coordinate error factor $\xi$.

20. The spacecraft of claim 19, wherein said deriving step includes the step of batch generating a least squares estimate of said error factor estimate $\xi^*$.

21. The spacecraft of claim 19, wherein said deriving step includes the step of recursively generating a least squares estimate of said error factor estimate $\xi^*$.

22. The method of claim 21, wherein said generating step includes the step of Kalman filtering said composite coordinate-measurement signal $S_{ms_{comp}}$ to realize said error factor estimate $\xi^*$.

23. The spacecraft of claim 12, wherein said torque generator comprises at least one thruster coupled to said body.

24. The spacecraft of claim 12, wherein said torque generator comprises at least one momentum wheel coupled to said body.

* * * * *